US010496817B1

(12) United States Patent
Furbish et al.

(10) Patent No.: US 10,496,817 B1
(45) Date of Patent: Dec. 3, 2019

(54) DETECTING ANOMALOUS VALUES IN SMALL BUSINESS ENTITY DATA

(71) Applicants: Kevin Michael Furbish, Tampa, FL (US); Michael Radwin, Mountain View, CA (US); Saikat Mukherjee, Fremont, CA (US)

(72) Inventors: Kevin Michael Furbish, Tampa, FL (US); Michael Radwin, Mountain View, CA (US); Saikat Mukherjee, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 220 days.

(21) Appl. No.: 15/418,636

(22) Filed: Jan. 27, 2017

(51) Int. Cl.
*G06F 21/00* (2013.01)
*G06F 21/55* (2013.01)
*G06F 16/28* (2019.01)
*G06Q 30/04* (2012.01)

(52) U.S. Cl.
CPC .......... *G06F 21/554* (2013.01); *G06F 16/285* (2019.01); *G06F 2221/033* (2013.01); *G06F 2221/2101* (2013.01); *G06Q 30/04* (2013.01)

(58) Field of Classification Search
CPC ............. G06F 21/554; G06F 17/30598; G06F 2221/033; G06F 2221/2101; G06Q 30/04
See application file for complete search history.

(56) References Cited

U.S. PATENT DOCUMENTS

| 2011/0047061 | A1* | 2/2011 | Lee | G06Q 40/02 705/37 |
| 2014/0058763 | A1* | 2/2014 | Zizzamia | G06Q 40/08 705/4 |
| 2016/0036798 | A1* | 2/2016 | Mulhearn | G06F 21/606 726/7 |

* cited by examiner

*Primary Examiner* — Tri M Tran
(74) *Attorney, Agent, or Firm* — Ferguson Braswell Fraser Kubasta PC

(57) ABSTRACT

A method involves identifying account data of an entity for a present time period, where the account data includes more than one first data value, creating a comparison group for the entity. The comparison group includes more than one second data value, the account data of the entity includes the second data values, and the second data values originate from a prior time period. The method further involves selecting, from the first data values, a subset of the first data values, selecting, from the second data values, a subset of the second data values, identifying, by accessing a library including anomaly detection methods, an anomalous value within the subset of the first data values by comparing the subset of the first data values with the subset of the second data values, selecting an action in response to identifying the anomalous value within the subset of first data values, and initiating the action.

16 Claims, 9 Drawing Sheets

DETECTING ANOMALOUS VALUES IN SMALL BUSINESS ENTITY DATA

BACKGROUND

Small businesses entities that utilize a software platform to help manage their business typically have a significant amount of data stored within the platform. Under the surface of that data are indicators of important financial events. The individuals operating small business entities often have limited to no experience running a business, and as a result often fail to notice such indicators, which may serve as early warning signs of impending trouble or great success. Consequently, the individuals operating small business entities are often unable to assess their management of the small business entity, and determine whether the small business is being managed in an effective and prosperous manner.

SUMMARY OF INVENTION

In general, in one aspect, the invention relates to a method comprising identifying account data of an entity for a present time period, wherein the account data includes a plurality of first data values; creating a comparison group for the entity, wherein the comparison group includes a plurality of second data values, wherein the account data of the entity includes the plurality of second data values, and the plurality of second data values originate from a prior time period; selecting, from the plurality of first data values, a subset of the first data values; selecting, from the plurality of second data values, a subset of the second data values; identifying, by accessing a library comprising anomaly detection methods, an anomalous value within the subset of the first data values by comparing the subset of the first data values with the subset of the second data values; in response to identifying the anomalous value within the subset of first data values, selecting an action; and initiating the action.

In general, in one aspect, the invention relates to a system comprising a data repository storing an instance of account data for each of a plurality of entities; a library of anomaly detection methods; a hardware processor and memory; and software instructions stored in the memory and configured to execute on the hardware processor, which, when executed by the hardware processor, cause the hardware processor to: identify, from the instance of account data for an entity, account data of the entity for a present time period, wherein the identified account data includes a plurality of first data values, create a comparison group for the entity, wherein the comparison group includes a plurality of second data values, and wherein the instance of account data for the entity includes the plurality of second data values, and the plurality of second data values originate from a prior time period, select, from the plurality of first data values, a subset of the first data values, select, from the plurality of second data values, a subset of the second data values, identify an anomalous value within the subset of the first data values by comparing the subset of the first data values with the subset of the second data values using one of the anomaly detection methods in the library, in response to identifying the anomalous value within the subset of first data values, select an action, and initiate the action.

In general, in one aspect, the invention relates to a non-transitory computer readable medium storing instructions. The instructions, when executed by a computer processor, comprising functionality for: identifying account data of an entity for a present time period, wherein the account data includes a plurality of first data values; creating a comparison group for the entity, wherein the comparison group includes a plurality of second data values, and wherein the account data of the entity includes the plurality of second data values, and the plurality of second data values originate from a prior time period; selecting, from the plurality of first data values, a subset of the first data values; selecting, from the plurality of second data values, a subset of the second data values; identifying, by accessing a library comprising anomaly detection methods, an anomalous value within the subset of the first data values by comparing the subset of the first data values with the subset of the second data values; in response to identifying the anomalous value within the subset of first data values, selecting an action; and initiating the action.

Other aspects and advantages of the invention will be apparent from the following description and the appended claims.

DETAILED DESCRIPTION

Figure 1A:
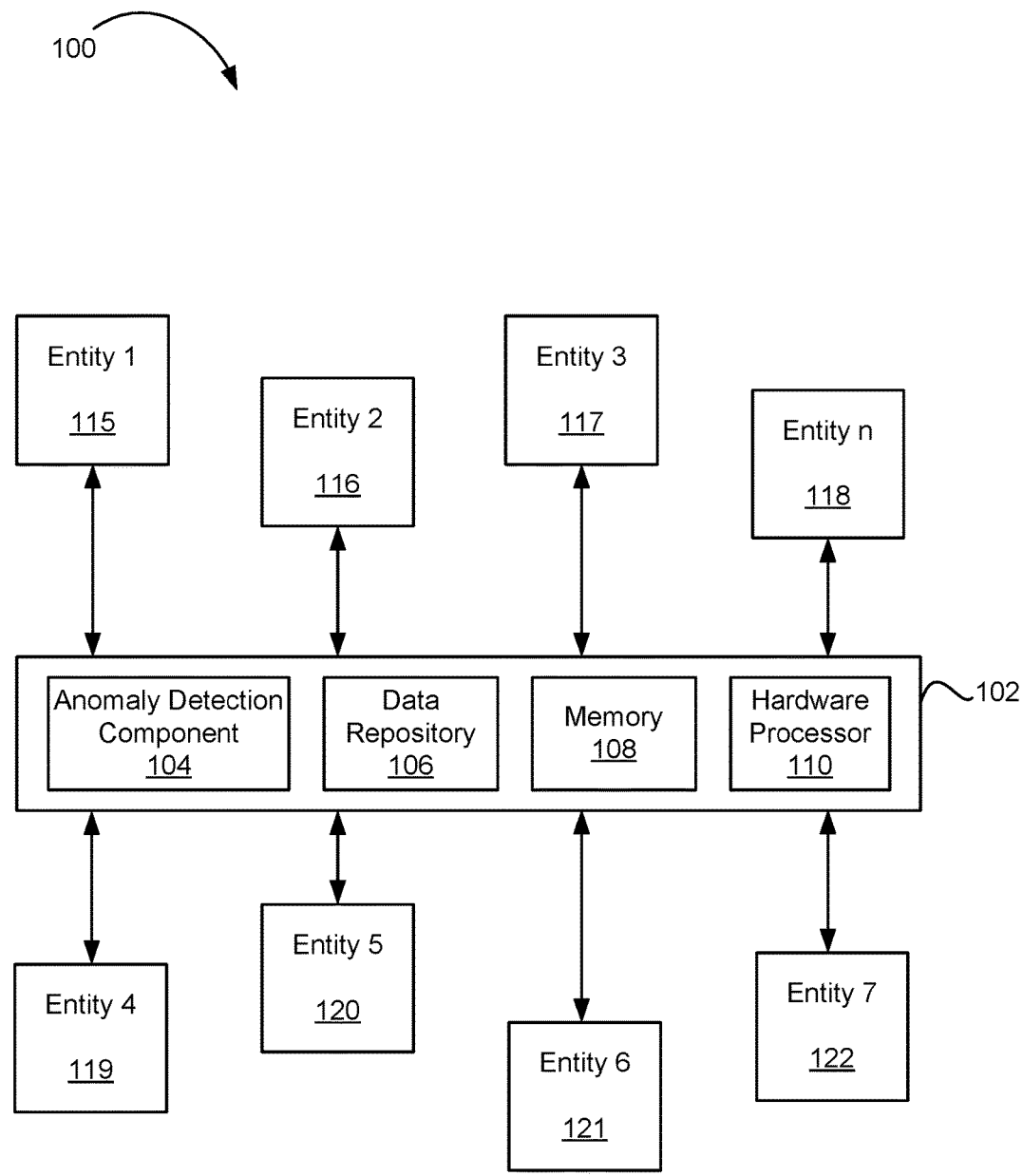
FIGS. 1A, 1B, and 1C illustrate a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In the following description, any component described with regard to a figure, in various embodiments of the invention, may be equivalent to one or more like-named components described with regard to any other figure. For brevity, descriptions of these components will not be repeated with regard to each figure. Thus, each and every embodiment of the components of each figure is incorporated by reference and assumed to be optionally present within every other figure having one or more like-named components. Additionally, in accordance with various embodiments of the invention, any description of the components of a figure is to be interpreted as an optional embodiment which may be implemented in addition to, in conjunction with, or in place of the embodiments described with regard to a corresponding like-named component in any other figure.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Described herein is a system that proactively monitors and analyzes the account data of small business entities within a financial management platform. Through such analysis, the system may identify anomalous values within the account data by comparing new data with account data of the business from a prior time period, or by comparing the data of the business with data from other similarly situated small business entities, also known as peers. An anomalous value may be an unexpected, atypical, or erroneous value within the small business entity's data, such as a low number of orders, a reduced cash flow, or a lack of business from repeat customers. Other examples of anomalous values include specific numerical amounts (such as a sale, estimate, bill, or payment) that are implausibly high or implausibly low. Upon detecting an anomalous value, the system may provide a notification to the small business entity, alerting the entity of the issue, or automatically perform some business action, with or without receiving approval from the small business entity.

FIG. 1A depicts a schematic block diagram of a system (100) used for detecting anomalous data values, in accordance with one or more embodiments of the invention. In one or more embodiments of the invention, one or more of the elements shown in FIG. 1A may be omitted, repeated, and/or substituted. Accordingly, embodiments of the invention should not be considered limited to the specific arrangements of modules shown in FIG. 1A.

As illustrated in FIG. 1A, the system (100) includes numerous entities (115-122) in communication with a financial management platform (102). Also, the financial management platform (102) is illustrated to include an anomaly detection component (104), a data repository (106), memory (108), and a hardware processor (110). Each of the entities (115-122) and the financial management platform (102) may be separate physical computing systems that communicate via one or more computer networks. As non-limiting examples, the computer network(s) may include wired and/or wireless portions of public and/or private data networks, such as wide area networks (WANs), local area networks (LANs), the Internet, etc.

In one or more embodiments, the financial management platform (102) is any computing environment that provides for the real-time execution of a financial management application for performing tasks on behalf of the entities (115-122) that use the financial management platform (102) in furtherance of organizational or commercial objectives. The financial management platform (102) may be utilized by the entities (115-122) to operate a business, such as, for example, by performing accounting functions, running payroll, calculating tax liabilities, billing customers, creating invoices, etc. A specific non-limiting example of a financial management platform (102) includes Intuit® QuickBooks®.

As used herein, an entity (115-122) includes any small business entity. A business entity is an organization that is formed under the laws of a jurisdiction in order to engage in commercial activities, or other activities as allowed by the laws under which it is formed. For example, a given business entity may sell a product (e.g., beverages, computer components, furniture, etc.) or provide a service (e.g., catering, plumbing, daycare, etc.). Still yet, a small business entity is any organization as set forth herein, that is privately held and meets the requirements of the jurisdiction in which it is formed, or the jurisdiction in which it operates, to be considered a small business. Such requirements may be directed to ownership restrictions, the number of employees, and/or periodic revenue. For example, in order to be considered a small business entity, the business may not employ more than a particular number of employees (e.g., less that 50, 100, 500, etc. employees), and/or generate more than a particular amount of annual revenue (e.g., less than $100,000, $500,000, etc. annual revenue). A small business entity may be organized as, for example, a sole proprietorship, a partnership, a corporation, or a limited liability corporation.

In one or more embodiments, the data repository (106) is any type of storage unit and/or device (e.g., a file system, database, collection of tables, or any other storage mechanism) for storing account data. Further, the data repository (106) may include multiple different storage units and/or devices. The multiple different storage units and/or devices may or may not be of the same type or located at the same physical site.

In one or more embodiments, the data repository (106) stores account data for each of the entities (115-122). As used herein, account data of one or more entities (115-122) includes any electronic information that is maintained by the financial management platform (102) in association with one or more entities (115-122). Specific examples of information that may be stored as account data are set forth below.

As used herein, the anomaly detection component (104) includes hardware and/or software for identifying an anomalous value within the account data of one or more of the entities (115-122). As described further below, the anomalous value may be identified by generating a baseline for a given one of the entities (115-122), and then comparing one or more data values of the given entity to the baseline. In one or more embodiments, the baseline may be generated using historical data for the given entity, and/or generated using the data of other entities that have been identified as peers of the given entity. Accordingly, the anomalous value may be any value within the account data of an entity that deviates by some minimum threshold from the baseline. Methods for calculating the baseline, the minimum threshold, and identifying the anomalous value are described below.

In one or more embodiments, the hardware processor (110) includes functionality to execute logic of the anomaly detection component (104). Moreover, logic of the anomaly detection component (104) may reside in the memory (108) during the execution. In one or more embodiments, the financial management platform (102) may include hardware components (not shown) for enabling communication between the hardware processor (110), the memory (108), the data repository (106), and/or the anomaly detection component (104). For example, the financial management platform (102) may include a system bus for communication between the hardware processor (110), the memory (108), the data repository (106), and/or the anomaly detection component (104).

As described herein, the anomaly detection component (104) may operate, by way of account data, to analyze the business activity, historical trends, and/or industry of a given entity (115-122), and identify an anomaly within the data of the entity (115-122). Further, based on the anomaly, the anomaly detection component (104) may initiate an action. For example, the anomaly detection component (104) may alert or notify the entity (115-122), or otherwise engage in a business management activity on behalf of the entity (115-122).

In one or more embodiments, the anomaly detection component (104) may operate on a big-data computation framework, such as Apache Spark, etc. Accordingly, account data of the entities (115-122) may be loaded into the memory (108), for rapidly aggregating data, determining peers, calculating metrics, and identifying anomalous values, as described herein below. In this way, an anomalous value may be detected, used to generate an alert, and/or corrected before the value impacts the operation of a business.

Figure 1B:
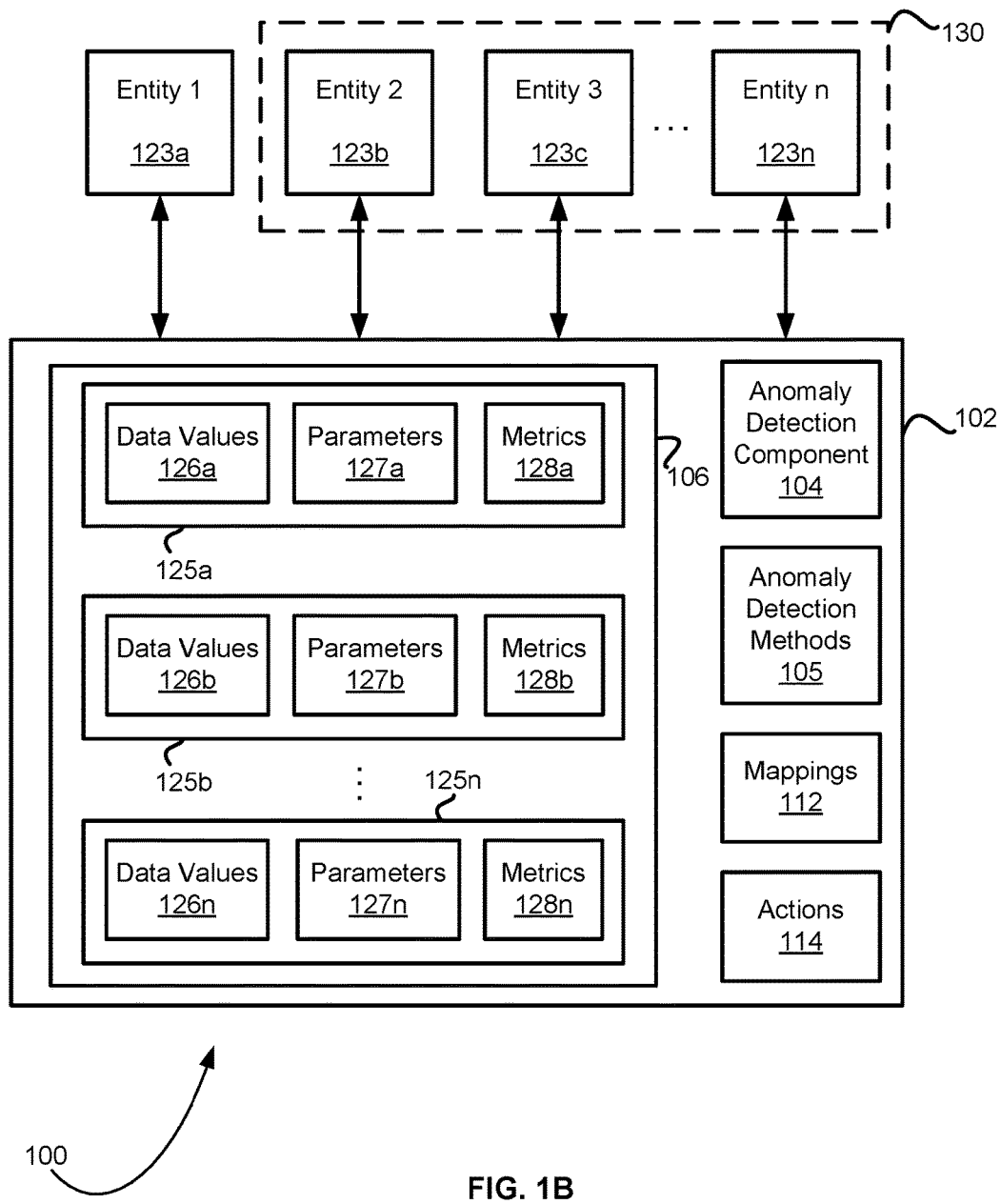

FIG. 1B depicts another schematic block diagram of the system (100). In FIG. 1B, the financial management platform (102) is shown to include, in addition to the anomaly detection component (104) and the data repository (106), a variety of mappings (112) and actions (114). Further, the financial management platform (102) is shown in communication with one or more of entities (123a-123n). Each of the entities (123a-123n) may be substantially identical to any of the entities (115-122) described in the context of FIG. 1A. In other words, each of the entities (123a-123n) is a different small business entity.

The data repository (106) is shown to store numerous instances of account data (125a-125n). In particular, the data repository (106) is shown to store account data (125) for each of the entities (123). For example, first account data (125a) is stored for a first entity (123a), second account data (125b) is stored for a second entity (123b), and third account data (125n) is stored for a third entity (123n). In this way, account data (125) may be independently stored and manipulated for each of the entities (123a-123n) that are using the financial management platform (102).

Each instance of the account data (125) may include data values (126), parameters (127), and metrics (128). As used herein, the data values (126) are created or stored to the financial management platform (102) based on management and business activity of the corresponding entity (123). For example, for a given entity (123a), data values (126a) in the account data (125a) may include transactional data (e.g., sales records of the entity (123a) by way of estimates, invoices, purchase orders and/or receipts), payroll information (e.g., pay frequency, number of employees of the entity (123a)), tax information (e.g., the contents of quarterly or annual tax filings of the entity (123a)), customer data (e.g., names, industries, and/or locations of the customers of the entity (123a)), vendor data, inventory items, bills and payments to vendors. Also, the data values (126a) for the business entity (123a) may reflect the activities of the entity (123a) within the financial management platform (102). For example, the data values (126a) may include clickstream data, indicating which aspects of the financial management platform (102) are utilized by the entity (123a), and/or the frequency with which the entity (123a) interacts with the financial management platform (102) (e.g., accesses the financial management platform (102), enters invoices or other transactional data to the financial management platform (102), etc.).

Accordingly, the data values (126) in the account data (125) for an entity (123) may include any combination of the above-noted types of information. Moreover, as used herein, a data value includes a single measured, recorded, or observed unit of account data. For example, the data values (126a) may include daily, weekly, monthly, and yearly sales, revenue, and/or profit of the entity (123a) for the past 3 years. Also, the data values (126a) may include the number of employees of the entity (123a), as well as each of their hourly rates. Furthermore, the data values (126a) may include the quarterly and yearly tax liabilities of the entity (123a); the names of the customers of the entity (123a); a cash balance of the entity (123a); all invoices issued by the entity (123a); an outstanding invoice balance of the entity (123a); a geographic location of the entity (123a); and/or industries of operation of the entity (123a), etc.

In one or more embodiments, any of the data values (126) in the account data (125) for an entity (123) may be tracked over time. For example invoice balances, cash balances, sales, returns, estimates, employee hours worked, etc. may be tracked on a daily, weekly, monthly, yearly basis for as long as the entity (123) utilizes the financial management platform (102).

In one or more embodiments, the account data (125) for an entity (123) may include parameters (127). As described herein, a parameter is any discrete unit of information that is selected as identifying information, or as a representative characteristic, of the associated entity (123). For example, first parameters (127a) of first account data (125a) may be identifying characteristics of a first entity (123a); second parameters (127b) of second account data (125b) may be identifying characteristics of a second entity (123b); and third parameters (127n) of third account data (125n) may be identifying characteristics of a third entity (123n). A parameter may be used to identify one or more peer entities of the entity (123) with which the parameter is associated. For example, the first parameters (127a) of the first entity (123a) may be used to identify peers of the first entity (123a).

In one or more embodiments, a given parameter for an entity (123) may be generated or calculated based on the data values (126) in the account data (125) of the entity (123). Any of the parameters (127) may be generated by performing a computation on one or more of the associated data values (126) in the account data (125). For example, a first one of the data values (126a) from the account data (125a) of the entity (123a) may be summed with, subtracted from, multiplied by, or divided by a second value from the account data (125a) of the entity (123a). As specific examples, the number of invoices per week an entity (123) is sending, an average daily cash balance of the entity (123), a ratio of annual revenue per employee of the entity (123), and/or revenue per month of the entity (123) may each be used as a parameter.

As illustrated in FIG. 1B, a comparison group (130) has been identified based on the parameters (127a) identified for a given entity (123a). In particular, the comparison group (130) includes numerous peer entities (123b-123n). As noted above, each peer entity (123b-123n) of the comparison group (130) is also associated with a corresponding instance of account data (125) in the data repository (106).

In one or more embodiments, the account data (125) for an entity (123) may include metrics (128). As described herein, a metric for an entity (123) is any information selected from the data values (126) of the entity (123) that is used for comparing the entity (123) to itself at a prior time period, or for comparing the entity (123) to other entities (123), such as, for example, peer entities identified using parameters (127). As an option, a metric for a given entity (123) may be selected from the data values (126) or the parameters (127) of the entity. For example, annual revenue, monthly profits, cash balance, revenue per employee, a ratio of new to repeat customers, a monthly amount of expenses in an account, a number of overdue invoices, the frequency with which transactions are entered that don't match account types, running low on inventory items, and/or the withdrawal of payments at unusual amounts or frequencies, may each be utilized as a metric.

In one or more embodiments, the metrics (128) of two or more entities (123) may be manipulated to identify the highest performing entities. For example, the metrics (128) of the entities (123b-123n) in the comparison group (130) may be sorted or analyzed to identify a subset of the entities (123b-123n) in the comparison group (130) that are the most successful. For example, the metrics (128b-128n) of each of the entities (123b-123n) in the comparison group (130) may be sorted to identify a top fraction of entities (123b-123n) in the comparison group (130). More specifically, the metrics (128b-128n) of the entities (123b-123n), respectively, may be sorted to identify a top fraction or top percentile (e.g., 5%, 10%, 20%) of the entities (123) in the group (130) with the highest operating cash flow. As a result, only those entities in the top fraction or top percentile may be used for comparison purposes when identifying an anomalous value in the account data (125a) of the entity (123a).

In one or more embodiments, parameters (127) of the account data (125) of an entity (123) may be used to identify one or more peer entities of the entity (123). For example, as illustrated in FIG. 1B, parameters (127a) of the account data (125a) of the entity (123a) are used to identify the entities (123b-123n) as peer entities. In one or more embodiments, the peer entities (123b-123n) of the entity (123a) may be identified by selecting a subset of the parameters (127a) of the entity (123a), and then comparing the subset of the parameters (127a) to the parameters (127) of the other entities (123) that use the financial management platform (102), in order to find matches. Accordingly, as used herein, a peer entity is any entity determined to share one or more selected parameters with a given entity (123a). A parameter may be shared if the values of the parameters are exactly the same between the entities (123), or fall within the same range, as described below. The anomaly detection component (104) may identify the parameters (127a) from the data values (126a). In one or more embodiments, the parameters (127a) that are selected for identifying peer entities of the entity (123a) may be identified by feature engineering.

One example of a value that may be extracted from the data values (126a) of the account data (125a) of a given entity (123a), and used as one of the parameters (127a), includes the industry of the entity (123a). For example, a 6-digit North American Industry Classification System (NAICS) code may be used as a parameter. A peer of the entity (123a) may include any other entity (123) that shares between 2 and 6 digits of the 6-digit NAICS code. For example, a brewery would have a NAICS code of 312120. Accordingly, other entities that are beverage manufacturers with NAICS codes of 3121xx may be identified as peer entities, or other entities that are beverage and tobacco product manufacturing businesses with NAICS codes of 312xxx may be identified as peer entities, and may be included in the comparison group (130).

Another example of a value that may be extracted from the data values (126a) of the account data (125a) of a given entity (123a) and used as one of the parameters (127a) includes the approximate annual revenue of the entity (123a). More specifically, the approximate annual revenue may be defined as a range of revenue values (e.g., <$10 k/year, $10,000-$25,000/year, $25,001-$100,000/year, etc.).

Another example of a value that may be extracted from the data values (126a) of the account data (125a) of a given entity (123a) and used as one of the parameters (127a) includes the geographical location of the entity (123a). More specifically, the zip code, city, county, state, designated market area, metropolitan statistical area, etc. may be used as a parameter.

Another example of a value that may be extracted from the data values (126a) of the account data (125a) of a given entity (123a) and used as one of the parameters (127a) includes a number of employees (e.g., 1, 2-4, 5-9, 10-29, 30-100, etc.). Similarly, the number of customers or vendors of the entity (123a) may be extracted from the data values (126a) of the account data (125a) of the entity (123a) and included within the parameters (127a).

Another example of a value that may be extracted from the data values (126a) of the account data (125a) of a given entity (123a) and used as one of the parameters (127a) includes an age of the entity. More specifically, a number of months, years, etc. may be used as a parameter (e.g., <1 month, 1-3 months, 3-9 months, 9-18 months, etc.). The age may include an amount of time (e.g., number of months, years, etc.) that has elapsed since the entity was organized, incorporated, founded, and/or began business operations. The age may include an amount of time (e.g., number of months, years, etc.) that has elapsed since the entity began using the financial management platform (102). In one or more embodiments, different ages may be used for different purposes. For example, the date of incorporation of a given entity (123a) may be used for identifying peer entities (123b-123n), while the time that the entity (123a) has been registered with the financial management platform (102) may be used to identify anomalous values within the entity's data.

Accordingly, through the use of the parameters (127a) entities (123b-123n) that are similar to a given entity (123a) may be identified. For example, if the entity (123a) is a brewery with $600,000 in annual revenue, and 3 employees on payroll, each of the other entities (123b-123n)—determined to be peers of the entity (123a) based on the parameters (127a) of the entity (123a)—may be breweries with $500,000-$750,000 of annual revenue, with 2-5 employees on payroll, and operating within 300 miles of the zip code of the entity (123a).

In one or more embodiments, the anomaly detection component (104) may identify an anomalous value by comparing account data (125) of a given entity (123) at a present time period to account data of its peer entities. For example, the anomalous value may be identified by comparing sales, revenue, payroll, and/or invoicing data values of the entity (123a) from the present time period to sales, revenue, payroll, and/or invoicing data values of one or more peer entities (123b-123n) at the present time period.

In one or more embodiments, the financial management platform includes a library of anomaly detection methods (105). In one or more embodiments of the invention, the library is a self-referential database, a table, a hierarchical file, data structure, etc.

As used herein an anomaly detection method includes any computation that may be used to identify a data value within account data (125) of an entity (123) that deviates by some minimum threshold from a baseline. The baseline may be set based on the data values (126b-126n) of peer entities (123b-123n) of the comparison group (130). Accordingly, the anomaly detection component (104) applies one or more of the anomaly detection methods (105) to data values (126a) of a given entity (123a) in view of the data values (126b-126n) of peer entities (123b-123n) of the comparison group (130).

Examples of particular anomaly detection methods include a percentile based comparison, a density based comparison (e.g. k-nearest neighbor), cluster analysis, a rule-based deviation, a calculation of a mean or standard deviation (i.e., for normal distributions), and a calculation of Mahalanobis distance.

In or more embodiments, the anomaly detection component (104) may select an action based on the anomalous value that has been identified, and initiate performance of the selected action. For example, the anomaly detection component (104) may automatically engage in a business activity on behalf of an entity (123), or transmit a notification to a user associated with the entity (123) that alerts the user to the anomalous value. As used herein, a "user" includes any person that is associated with the entity (123). For example, the user may be a person that owns or manages the entity that he or she is associated with.

As described herein, the actions (114) include one or more processes or activities that can be initiated by the anomaly detection component (104). In one or more embodiments, the actions (114) include transmitting a message, such as an alert or notification. For example, the actions (114) may include the transmission of a text message, email, or pop-up window, to an entity (123), that indicates an anomalous value has been identified.

In one or more embodiments, where an action includes transmitting a message, the message may include a recommendation. For example, if the identified anomalous value is that a particular entity (123) has low number of vendors supplying a key component relative to its peers, then the message may recommend that the particular entity (123) find alternative or additional vendors for the component. As an option, the message may even suggest specific vendors that the particular entity (123) could work with. As another example, if the identified anomalous value is from an entered transaction, wherein the description of the transaction doesn't match the typical account type (e.g., a rental deposit check is misclassified as rental income), then the financial management platform may recommend a different account for the journal entry.

In one or more embodiments, the actions (114) include placing an order for a product, cancelling an order for a product, sending payment to a person or business, sending a request for payment to a person or business, etc. For example, if the identified anomalous value is that a particular entity (123) is low on inventory for a product, then an action may include a message that asks the entity (123) if the financial management platform (102) should order more of the product. As an option, the financial management platform (102) may simply order more of the product without approval of the entity (123). In one or more embodiments, the actions (114) include suspending the performance of a previously scheduled or recurring activity, such as payroll or bill payments. For example, if a particular employee typically works and is paid for 40 hours/week, but a payroll record is identified that includes only 4 hours/week (i.e., a missing '0' for that employee, or a payroll record with 80 or 400 hours/week (i.e., implausibly large, an extra '0', etc.), for example, then an action may include suspending a payroll payment for that employee. Further, the action may include alerting that manual review of the payroll record is necessary.

Also, as described herein, the mappings (112) include one or more associations or connections between potential anomalous values and the actions (114). More specifically, a mapping links a specific anomalous value to a specific action. In one or more embodiments, a mapping may be based on a magnitude and/or type of the anomalous value. For example, an anomalous value detected within the payments or sales data of the data values (126a) of a given entity (123a) may be classified as a first type of anomaly; an anomalous value detected within inventory data of the data values (126a) of the entity (123a) may be classified as a second type of anomaly; and an anomalous value detected within the payroll of the data values (126a) may be classified as a third type of anomaly. Thus, each of the three types of anomalies may be respectively mapped to three different actions within the actions (114). Still yet, as another example, a first anomalous annual sales value within the data values (126a) of a given business entity (123a) may be classified as having a first magnitude; and a second anomalous annual sales value within the data values (126a) of the business entity (123a) may be classified as having a second magnitude that is greater than the first. Thus, the two anomalies of different magnitudes may be respectively mapped to two different actions within the actions (114).

Figure 1C:
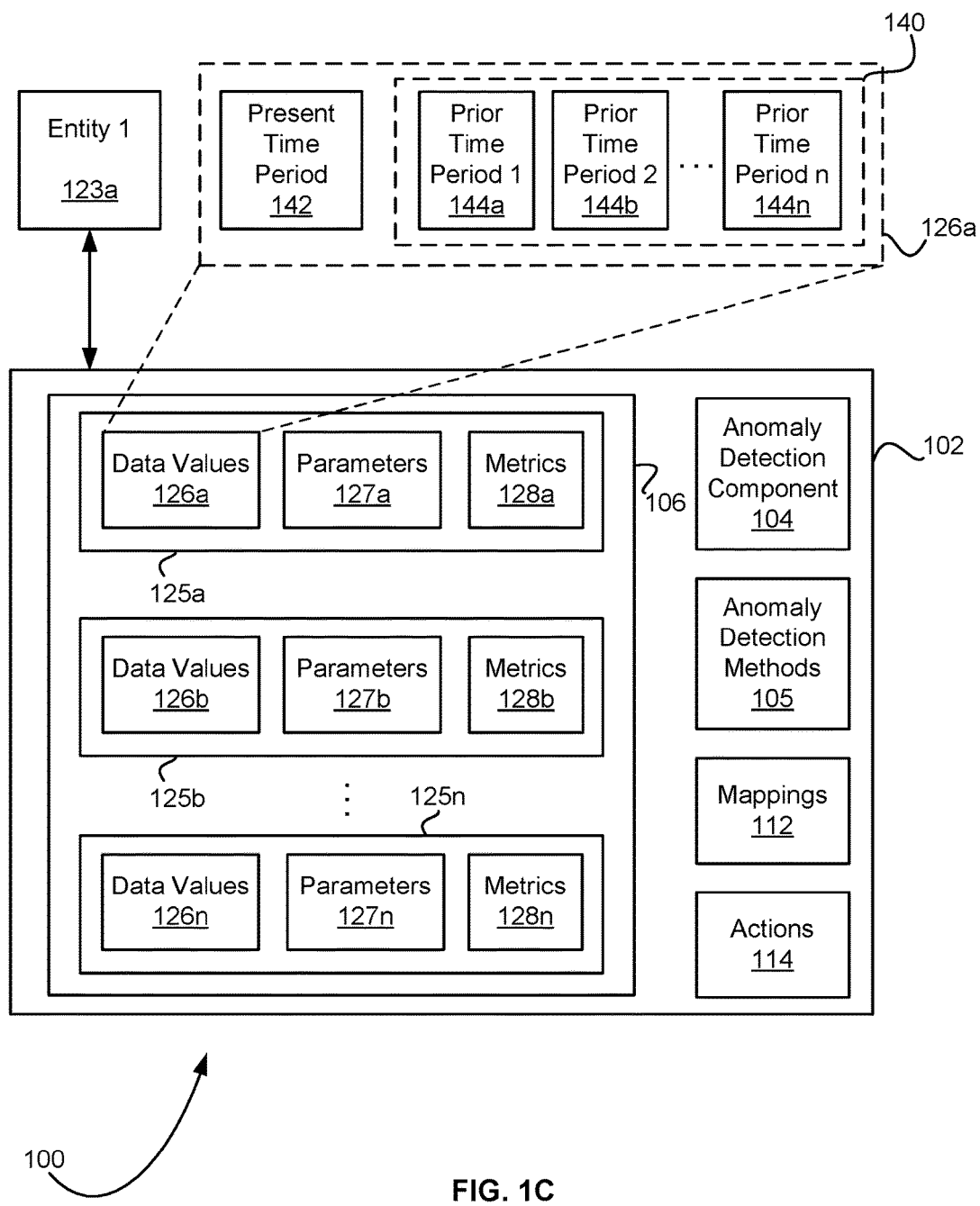

FIG. 1C depicts another schematic block diagram of the system (100). In FIG. 1C, a comparison group (140) has been created using only account data (125a) of a particular entity (123a). Specifically, as shown in FIG. 1C, the comparison group (140) has been created using only data from one or more prior time periods (144).

As used herein a prior time period may be a prior week, month, quarter, year, etc. during which the entity (123a) was engaged in business activities. For example, the data of each of the prior time periods (144a-144n) may be from a different respective month (e.g., the data of prior time period 1 (144a) is from 1 month prior, the data of prior time period 2 (144b) is from 2 months prior, the data of prior time period n (144n) is from 6 months prior, etc.) As another example, the data of each of the prior time periods (144a-144n) may be from the same month or quarter in a different year (e.g., the data of prior time period 1 (144a) is from November 2010, the data of prior time period 2 (144b) is from November 2011, the data of prior time period n (144n) is from November 2015, etc.), such that seasonal or annual trends can be accommodated during creation of a baseline.

Accordingly, the comparison group (140) is composed in a manner that enables a comparison of the entity (123a) with itself during a prior period of time. Such a comparison may identify anomalous data values in periodic data. Specific examples include the comparison of sales, revenue, the instances of repeat customers, etc. from prior time periods to data of a present time period (142) of the entity (123a), in order to identify anomalous values in the data of the present time period (142).

Thus, in one or more embodiments, the anomaly detection component (104) may identify an anomalous value in the data values (126a) of a given entity (123a) by comparing data of the entity (123a) for a present time period (142) with a baseline built using data of the entity from prior time periods (144a-144n).

Any of the anomaly detection methods (105) described above may be used to identify a data value within the present time period (142) that deviates by some minimum threshold from a baseline set by the data of the prior time periods (144).

In one or more embodiments, a comparison group of peer entity data may be created concurrently with, or sequentially to, the creation of a comparison group from prior time period data of an entity. Further, both comparison groups may be compared with the account data of a present time period of the entity to determine whether an anomalous value exists in the account data of the entity.

While FIGS. 1A-1C depict possible configurations of components, other configurations may be used without departing from the scope of the invention. For example, various components may be combined to create a single component. As another example, the functionality performed by a single component may be performed by two or more components.

Figure 2:
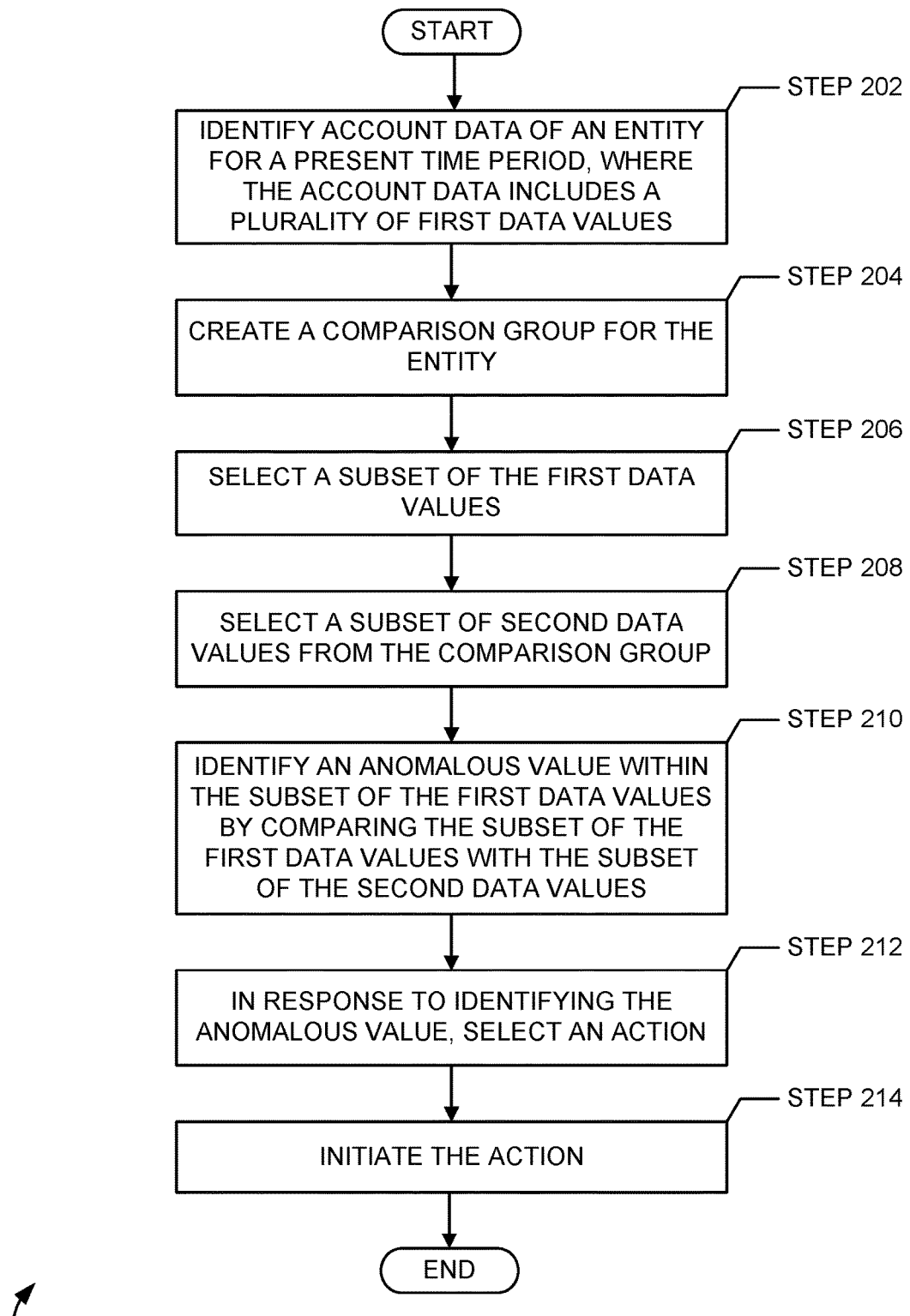
FIG. 2 illustrates a method performed in accordance with one or more embodiments of the invention.

FIG. 2 depicts a flowchart of a method (200) for detecting anomalous values in small business entity data, in accordance with one or more embodiments of the invention. In one or more embodiments, one or more of the steps shown in FIG. 2 may be omitted, repeated, and/or performed in a different order. Accordingly, embodiments of the invention should not be considered limited to the specific arrangements of steps shown in FIG. 2. In one or more embodiments, the method (200) described in reference to FIG. 2 may be practiced using the anomaly detection component (104) of the system (100) described in reference to FIGS. 1A-1C, above, and/or involving the computing system (500) described in reference to FIG. 5A.

At Step 202, account data of an entity is identified for a present time period. The account data includes numerous first data values. As described herein, the present time period may be the current week, current month, current quarter, current year, etc. In one or more embodiments, the account data of the entity may be identified in response to a user of the entity entering data. For example, the account data of the entity may be selected or identified for anomalous event evaluation when the user logs into a financial management platform, enters transactional data, or runs a report. Further, the account data of the entity may include any combination of transactional data, payroll information, tax information, customer data, or clickstream data.

Also, at Step 204, a comparison group is created for the entity. The comparison group includes numerous second data values.

In one or more embodiments, the comparison group may be created by identifying parameters within the account data of the entity, and then searching for peer entities. Accordingly, the second data values may include data created, generated, or recorded, by peer entities. Such peer entities may be other businesses operating in a similar industry, with a geographic proximity, and with similar financial data values.

In one or more embodiments, the comparison group may be created by identifying account data of the entity from a prior time period. For example, the comparison group may be created by aggregating the account data of the entity from prior time periods. As a more specific example, if the present time period is the first quarter of fiscal year 2016, then the prior time periods may include the first quarter of fiscal year 2012, the first quarter of fiscal year 2013, the first quarter of fiscal year 2014, and the first quarter of fiscal year 2015. Accordingly, the second data values may include data created, generated, or recorded by entity during a prior period of time.

Further, at Step 206, a subset of the first data values are selected; and, at Step 208, a subset of the second data values is selected. The contents of the first subset of data values may mirror the contents of the second subset of data values. For example, if the first subset of data values includes a cash balance, a number of invoices sent per week, and inventory levels of product, as found within the first data values; then the second subset of data values may also include a cash balance, a number of invoices sent per week, and inventory levels of product, as found within the second data values. The subset may be selected by removing from further computation or evaluation any data value not in the subset. By selecting the subsets of data values, a meaningful and efficient comparison may be performed between the account data of the entity for the present time period and the data of the comparison group.

Accordingly, at Step 210, the subset of the first data values is compared with the subset of the second data values to identify an anomalous value within the first subset of data values. The comparison of the subset of the first data values with the subset of the second data values may include any of a percentile based comparison, a density based comparison (e.g., k-nearest neighbor), cluster analysis, a rule-based deviation, a calculation of a mean or standard deviation (i.e., for normal distributions), and a calculation of Mahalanobis distance. In one or more embodiments, the data values being compared may be manipulated prior to the comparison. For example, for two data values being compared, the logarithms of the data values may be computed and compared, rather than directly comparing the two data values. In one or more embodiments, if the comparison of the subset of the first data values with the subset of the second data values includes a density based comparison, then data values may be scaled prior to the comparison, in order to prevent less important data points outweighing more important data points. For example, for a given entity, the difference between 1 and 10 employees may be of far greater significance than the difference between $500,000 and $501,000 in annual revenue. Accordingly, the data values may be scaled to ensure that the difference in revenue does not outweigh the difference in the number of employees.

Further still, in response to identifying the anomalous value, an action is selected at Step 212. Still yet, the action is initiated at Step 214. In one or more embodiments, the action may be selected using a mapping. Specifically, the anomalous value may be classified based on its magnitude and/or type. Further, a mapping may then be selected based on the classification of the anomalous value, and an action is then selected based on the mapping. For example, for a given data value identified as anomalous, such as stock on hand for a product of the entity, a first anomalous value may be mapped to an action that includes transmitting a message. Accordingly, in such an example, the message is transmitted at Step 214. The message may inform the entity that the product should be re-ordered from a supplier. However, a second anomalous value that is substantially lower than the first anomalous value may be mapped to an action that includes automatic re-ordering. Accordingly, in such an example, the product is automatically re-ordered from the supplier, without intervention or assistance from a user of the entity. The action may also include, concurrent or subsequent to the re-ordering, the transmission of a message to the entity, where the message notifies the entity that the product has been ordered. Accordingly, where stock approaches critically low levels, the issue may be rectified without intervention of the entity.

In one or more embodiments, the action may include a communication with a third-party. For example, the action may include sending an email or initiating a phone call. The third-party may include a client, a vendor, a government official, etc. In one or more embodiments, the action may include creating or modifying a transaction in an accounting system. For example, if an anomalous value includes a payment for a payment marked as unreceived, then the action may include marking the payment as received within an accounting system.

In one or more embodiments, the action may include an interaction with a third-party computing system. For example, the action may include an online payment, funds transfer, or inventory order. In one or more embodiments, the action may include rectifying errors discovered in records. For example, an anomalous value may include a mistaken customer refund, and the action includes correcting the journal entry to reflect a credit memo transaction. In one or more embodiments, the action may include scheduling future actions or reminders. For example, if an anomalous value includes an insufficient tax pre-payment, then the action may include calendaring some time for the user to re-calculate taxes owed, or to pay the correct amount. In one or more embodiments, the action may include providing a recommendation regarding a product or service. For example, if the anomalous value includes an abnormally high number of overdue invoices, then the action may include recommending a collection agency. As another example, if the anomalous value includes abnormally low mileage expenses, then the action may include recommending an application for recording mileage. In one or more embodiments, the action may include educational advice. For example, if the anomalous value includes an abnormally high number of overdue accounts receivable, the action may include providing information regarding collection agencies, the potential impact of invoice factoring, or a suggestion to change the payment terms offered to customers.

Figure 3A:
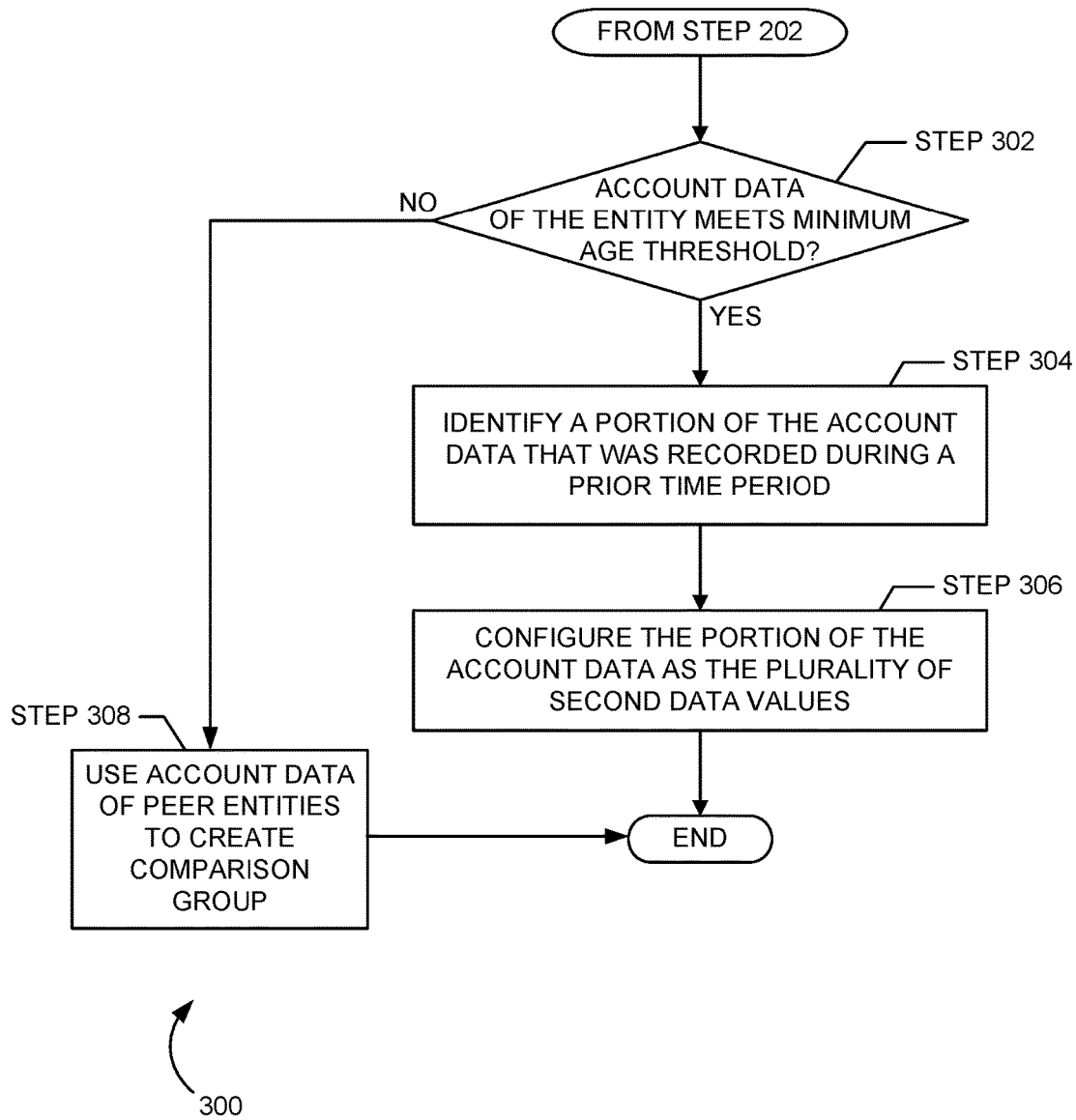
FIGS. 3A and 3B illustrate methods performed in accordance with one or more embodiments of the invention.

FIG. 3A depicts a flowchart of a method (300) for creating a comparison group of an entity, in accordance with one or more embodiments of the invention. In one or more embodiments, one or more of the steps shown in FIG. 3A may be omitted, repeated, and/or performed in a different order. Accordingly, embodiments of the invention should not be considered limited to the specific arrangements of steps shown in FIG. 3A. In one or more embodiments, the method (300) described in reference to FIG. 3A may be practiced using the anomaly detection component (104) of the system (100) described in reference to FIGS. 1A-1C, above, and/or involving the computing system (500) described in reference to FIG. 5A.

At Step 302, it is determined whether account data of a selected entity is of a minimum age threshold. In one or more embodiments, the minimum age threshold may be a number of weeks, months, quarters, or years. For example, it may be determined, at Step 302, whether the selected entity has recorded at least 3 years of account data on a financial management platform.

If it is determined, at Step 302, that the account data of the entity does not meet the minimum age threshold, then, at Step 308, account data of peer entities may be used to create a comparison group for the entity, and the method (300) ends. Because of the high failure rate of small business entities, comparing the data of an entity with its own data from a prior time period may not be useful for identifying anomalous values unless the entity is of a minimum age. In other words, not only may useful data from a prior time period not exist, but because of the high failure rate of small business entities, using data from recent prior time periods to identify any anomalies may actually prove unsuccessful. This may be because the data includes a significantly number of mistakes or errors. Accordingly, if the entity fails to meet a minimum threshold age, then it may be more beneficial to identify anomalous data values using the data of the entity's peers.

However, if it is determined, at Step 302, that the account data of the entity meets the minimum age threshold, then, at Step 304, a portion of the account data that was recorded during a prior time period is identified. The portion of account data recorded during the prior time period may be defined by a start date and end date. For example, the start date and the end date may span months, years, etc. Still yet, the start date and the end may capture periods or seasons over multiple years.

Additionally, at Step 306, the portion of the account data is configured as numerous second data values within a comparison group. The portion of the account data may be configured as the second data values by copying values or flagging values within the portion of account data. In this manner, the portion of account data from the prior time period(s) may be used for a comparison with data from a current time period.

Figure 3B:
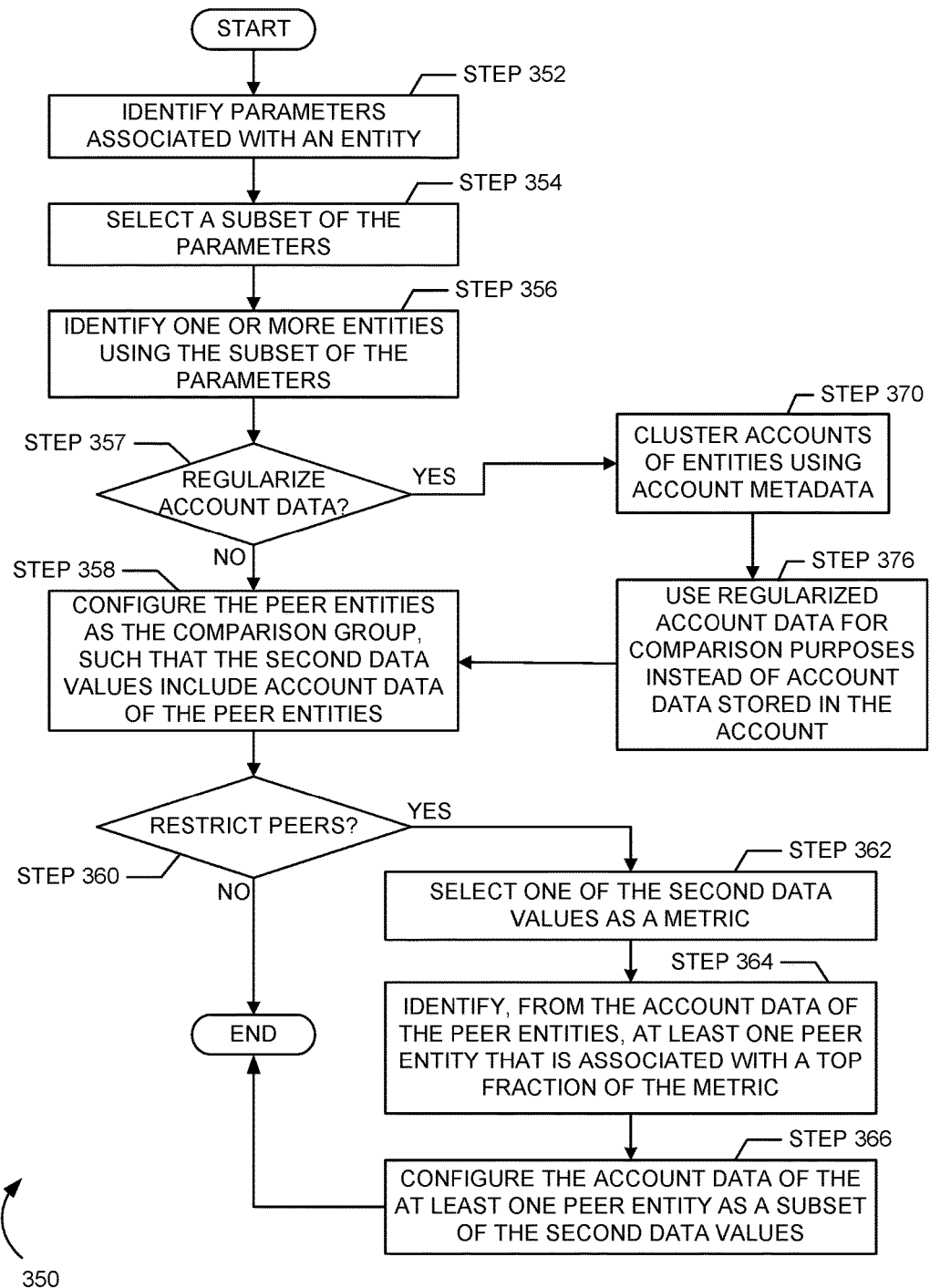

FIG. 3B depicts a flowchart of a method (350) for creating a comparison group of an entity using account data of peer entities, in accordance with one or more embodiments of the invention. In one or more embodiments, one or more of the steps shown in FIG. 3B may be omitted, repeated, and/or performed in a different order. Accordingly, embodiments of the invention should not be considered limited to the specific arrangements of steps shown in FIG. 3B. In one or more embodiments, the method (350) described in reference to FIG. 3B may be practiced using the anomaly detection component (104) of the system (100) described in reference to FIGS. 1A-1C, above, and/or involving the computing system (500) described in reference to FIG. 5A.

At Step 352, parameters associated with an entity are identified. In one or more embodiments, the parameters associated with the entity may be identified by analyzing the account data of the entity, such as, for example by performing feature engineering. In addition, the parameters may be identified by analyzing the account data of numerous other entities using a financial management platform. For example, by using the account data of numerous entities (e.g., hundreds, thousands, hundreds of thousands, etc.), an initial pool of deterministic parameters may be identified. Further, from that initial pool, parameters that are associated with the entity may be identified. In other words, from that initial pool, parameters that can be calculated or determined using the account data of the entity may be identified.

Also, at Step 354, a subset of the parameters is selected. In one or more embodiments, the subset of the parameters may be selected based on a predefined maximum number of parameters. For example, if a predefined maximum is configured, and the number of parameters identified at Step 352 exceeds the predefined maximum, then some of the parameters may be removed such that the subset of parameters does not exceed the maximum.

Still yet, one or more peer entities are identified, at Step 356, using the subset of the parameters. The peer entities may be identified by searching through the account data of numerous other entities using a financial management platform. In one or more embodiments, each peer entity is associated with a set of parameters that match the subset of parameters selected at Step 354. For example, if the subset of parameters includes a range of annual revenue (e.g., $50,000-150,000 annual revenue), an industry (e.g., restaurant), and a percentage of repeat customers (e.g., >10%), then each of the peer entities will be determined, using the respective account data, to match the subset of parameters. In other words, each of the peer entities will also have between $50,000-150,000 in annual revenue, be operating within the restaurant industry, and have a repeat customer rate that exceeds 10%.

In one or more embodiments, a minimum number of peer entities may be required (e.g., at least 10, 25, 50 peer entities), such that the minimum number of peer entities must be identified at Step 356 before the method (350) may proceed further. In one or more embodiments, if the minimum number of peer entities is not met by a first subset of the parameters, then the first subset of parameters may be broadened to a second subset of parameters. For example, and using the prior example, the parameters selected at Step 354 may be broadened to include a range of annual revenue between $50,000-300,000 in annual revenue, entities in both the restaurant and catering industries, and/or, a percentage of repeat customers that exceeds 5%. Using this broadened subset of parameters, an adequate number of matching peer entities may be identified. In one or more embodiments, if the minimum number of peer entities is not met by a first subset of the parameters, then the system may accept that not all parameters must be within a specific range for another entity to be considered a peer entity. For example, if two entities are in the same industry in the same city, have approximately the same annual revenue, pay approximately the same rent, and/or have approximately same number of employees, but one has been in business for 20 years and the other for only 1 year, then, regardless of such an age difference, the two entities may be considered peers.

Next, at Step 357, it is determined whether the account data of the entities will be regularized. In one or more embodiments, account data of the target entity for which an anomalous data value will be subsequently identified, and/or account data of the peer entities identified at Step 356 may be regularized.

In one or more embodiments, the account data for each entity may include a chart of accounts of the respective entity. In other words, the account data of the identified peer entities may include a respective chart of accounts for each of the peer entities. Also, the account data of the target entity may include a chart of accounts for the target entity. The data values within like accounts of the charts of accounts may be compared to identify anomalous values (e.g., at Step 210 of the method (200) of FIG. 2). Thus, if the charts of accounts of the identified peer entities all share the same format as the chart of accounts of the target entity, then it may be determined, at Step 357, that the account data does not need to be regularized, and the method (350) of FIG. 3B will proceed to Step 358. For example, each of the charts of accounts of the identified peer entities and the target entity may have been created by the same financial management application during an initial account configuration process. Moreover, because the identified peer entities have been identified using a subset of parameters, it is possible that all of the charts of accounts are configured for a common usage, based on, for example, their industry, geographic location, etc. shared with the target entity. Accordingly, it may not be necessary to regularize the account data of the different entities.

However, in one or more embodiments, an entity may have previously modified its chart of accounts in some manner. For example, a given peer entity may have added one or more accounts to its chart of accounts, or removed one or more accounts from its chart of accounts. Also, in one or more embodiments, the chart of accounts for an entity may be structured in a unique or customized manner. For example, if a given peer entity is managed by an accountant, the accountant may have customized the peer entity's chart of accounts to better suit the accountant's preferences or practices. In particular, a first accountant of a first entity may track sales tax in a single account, while a second accountant of a different entity creates, in that entity's chart of accounts, a different sales tax account for each zip code that the entity has collected tax in. As another example, a first accountant of a first entity may prefer to reduce the number of expense accounts in the chart of accounts for a first entity, while a second accountant of a different entity has created, in that entity's chart of accounts, a different account for every type of expense (e.g. utilities, rent, marketing, taxes, insurance, continuing education, etc.).

Consequently, it may be difficult to compare financial data values of one business with other businesses to identify anomalous values, even if all businesses are considered to be peers. Accordingly, if it is determined that the structure of the account data of any of the entities has been modified since creation, then it may be determined, at Step 357, that the account data should be regularized. Similarly, if it is determined that the structure of the account data of the target entity deviates from the structure of the account data of any of the identified peer entities, then it may be determined, at Step 357, that the account data should be regularized.

Next, at Step 370, the accounts of the entities are clustered using account metadata. The accounts that are clustered may include accounts of a target entity, for which an anomalous value will be identified. The accounts that are clustered may include accounts of entities that have been identified as peer entities of the target entity. In one or more embodiments, the account metadata for a given account, in a chart of accounts, may include an account name, an account category type, an account detail type, and/or an account hierarchy. In one or more embodiments, the account metadata, for a given account in a chart of accounts, may include transaction metadata. The transaction metadata may include a memo, a transaction type, a due date, and/or a balance associated with a transaction in an account. The clustering of the accounts may be performed using any clustering technique. For example, the accounts may be clustered using k-means clustering, fuzzy c-means clustering, hierarchical clustering, etc. In one or more embodiments, classification algorithms, such as conditional random fields (CFR), may be used in place of clustering techniques when regularizing the account data in Step 370 for purposes of comparison.

As a result of clustering the accounts of the entities, groups of accounts of the entities that are used for common purposes may be discovered. In this manner, clustering may regularize the account data of the various accounts of the target entity and the identified peer entities. Anomalous values may be more effectively identified based on comparisons between similarly used accounts. In other words, the data values within these groups of accounts may enable a more effective identification of anomalous values during subsequent comparison steps. For example, using the sales tax example above, clustering the accounts of the entities would reveal clusters of sales tax accounts at the zip code level, as well as one or more clusters of sales tax accounts that are not divided by zip code. As a result, a subsequent comparison step may rely on the sales tax data values that are associated with a single zip code to identify an anomalous value that would not have been identified without such clustering.

At Step 376, the regularized account data is used for comparison purposes instead of the account data that is actually stored in the account. As noted above, the regularized account data might be generated using clustering techniques, in one or more embodiments. Or in one or more embodiments, the regularized account data might be generated using classification algorithms.

For example, in one or more embodiments, numerous accounts for a peer entity that breaks a single type of transaction into separate accounts may be combined together into a single account. This regularized account data (i.e., a single account) may be used instead of the original account data, and may be subsequently compared with entities that also use a single account for holding that type of transaction. On the other hand, an account for a peer entity that maintains different types of transactions in a single account may be broken out into multiple different accounts. This regularized account data (i.e., multiple accounts) may be used instead of the original account data, and may be subsequently compared with the accounts of other peer entities that utilize the different accounts for the different types of transactions.

In other words, if the method (350) of FIG. 3B is being performed to create a comparison group for a target entity, then, at Steps 370 and 376, the account data of the peer entities identified at Step 356 may be regularized to facilitate a comparison. Also, the account data of the target entity may be regularized at Steps 370 and 376 to facilitate such comparison. As an example, if the target entity uses a single account within its chart of accounts for different expense types, then, for a peer entity that maintains a different account for each expense type, those different accounts may be combined into a single account; or the target entity's single account may be broken out into multiple accounts. Consequently, data values may be aggregated and/or decoupled during the regularization of Steps 370 and 376, thereby enabling the comparison of entities at both the aggregate level (e.g., total sales tax paid), as well as at various fine-grained levels (e.g., sales tax paid for each zip code).

Still yet, at Step 358, the peer entities are configured as a comparison group, as described in the context of Step 204 of FIG. 2. Accordingly, by way of the Steps 352-358, a comparison group may be created from peer entities of an entity based on parameters associated with an entity. The comparison group may then be used as a baseline to identify an anomalous value in the account data of the entity.

Also, at Step 360, it is determined whether the peer entities should be restricted. In one or more embodiments, it may be determined that not all peer entities identified at Step 356 are fit for comparison purposes. For example, some peer entities may be relatively unsuccessful small businesses, may be missing data, or otherwise be undesirable for use in a comparison. If it is determined that no peers need to be restricted out, then the method (350) ends.

However, if it is determined that one or more peers need to be restricted out, then one of the second data values is selected, at Step 362, as a metric. For example, annual sales, cash balance, the rate of repeat customers, etc. may be selected as a metric. Moreover, from the account data of the peer entities, one or more peer entities are identified, at Step 364, that is associated with a top fraction of the metric. For example, if the metric is a cash balance, then the top 5%, 10%, 20%, etc. of peer entities with the greatest cash balance may be identified. As another example, if the metric is monthly profits, then the top $\frac{1}{20}$, $\frac{1}{10}$, etc. of peer entities with the greatest monthly profits may be identified.

In one or more embodiments, the selection of the metric may depend on the entity being evaluated to determine if its account data includes an anomalous value. For example, if the entity is classified in a consumer-facing industry, then one valuable metric may be the amount of money that the entity, and its peers, have spent on advertising. However, if the entity is classified as an industrial machine shop, then the entity, and its peers, may not spend any money on advertising. Accordingly, a different data value may be selected as a metric for such an entity. As another example, the usefulness of a certain data value as a metric may depend on a location of an entity and its peers.

Further, at Step 366, the account data of the peer entities associated with the top fraction of the metric is configured as a subset of the second data values. In one or more embodiments, the Steps 362-366 may occur within Step 208, as described in the context of the method (200) of FIG. 2. In other words, the account data of selected peer entities may be populated as the subset of second data values that are compared with the subset of first data values of a particular entity to identify an anomalous data value within the data of the particular entity. Accordingly, the account data of the peer entities associated with the top fraction of the metric may be selected as the baseline for identifying the anomalous value. In this way, only the account data of the best performing entities may be used for comparison purposes when identifying the anomalous value within the data of the entity.

While the various steps in the flowcharts described above are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention.

Figure 4A:
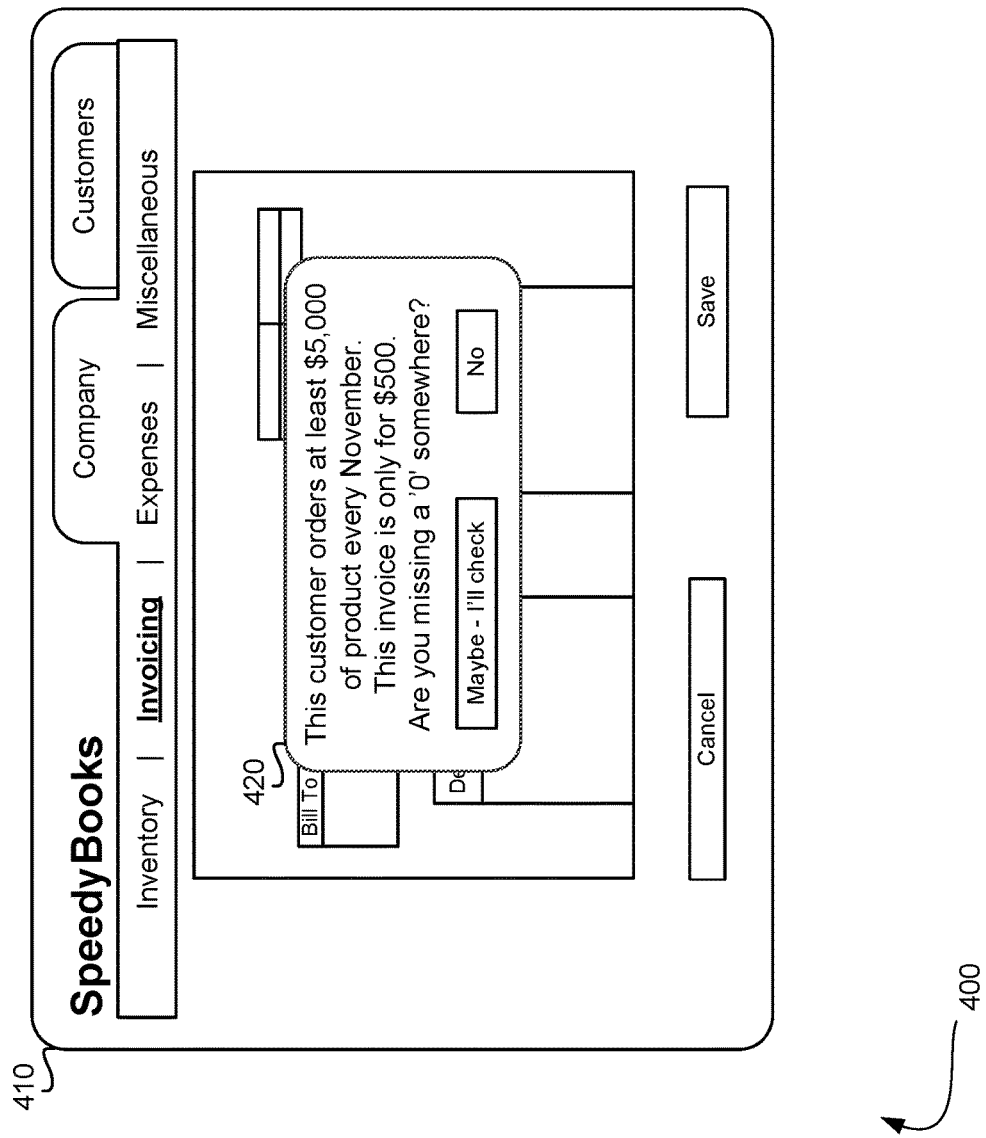
FIGS. 4A and 4B illustrate screenshots depicting the detection of anomalous values within the data of a small business entity, in accordance with one or more embodiments of the invention.
Figure 4B:
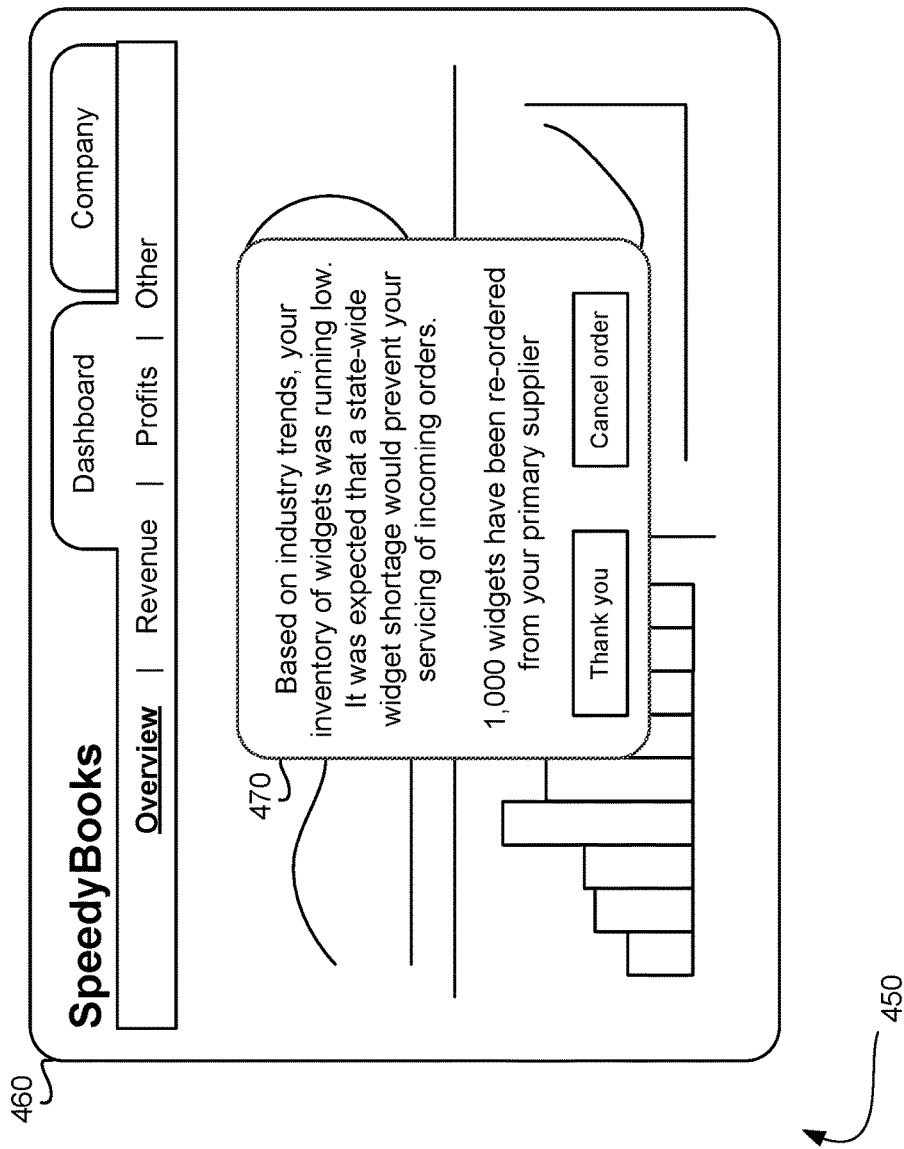

FIG. 4A and FIG. 4B each show screenshots of an example of detecting an anomalous value in the data of a small business entity, in accordance with one or more embodiments of the invention. The examples of FIGS. 4A and 4B may be practiced using the system (100) of FIGS. 1A, 1B, and 1C or the computing system (500) of FIG. 5A, and be based on the methods described with respect to FIGS. 2, 3A, and 3B, above.

Referring now to FIG. 4A, example (400) illustrates the display of a user interface (410) of a financial management platform. In particular, as shown in the user interface (410), a user of an entity has entered an invoice for a customer of the entity. The invoice lists goods or services provided by the entity to the customer, with request for payment that is due. After the user has indicated the invoice is complete (i.e., by selecting the "Save" button), the contents of the invoice are saved to the account data of the entity. Moreover, the contents of the invoice are evaluated relative to data from prior time periods of the entity. In particular, it is determined using data of prior time periods that the customer has ordered each November for the past 5 years approximately $5,000 of goods/services from the entity. This may be determined, for example, by determining that at least 3 years of data exists for the entity, creating a comparison group that includes the entity's orders or invoices for each November from the past 3 years, and then comparing the contents of the invoice to the data values in the comparison group.

As a result of such comparison, it is determined that the contents of the current invoice deviate from the baseline of the comparison group by a factor of 10. In response to the comparison, an action is initiated. In particular, the action includes the transmission of a message (420) to the user of the entity, requesting that the user evaluate the information entered in the invoice. The message (420) provides a hint to the user, that a '0' may be missing—the addition of which would put the contents of the invoice in accordance with the established baseline. In response to the message (420), the user may indicate that he or she will review the contents of the invoice (i.e., "Maybe—I'll check" button), or indicate that he or she is already sure of the contents of the invoice, and the invoice should be saved as-is (i.e., "No" button).

Referring now to FIG. 4B, example (450) illustrates the display of a user interface (460) of a financial management platform. In particular, the user interface (460) is presented to a user of an entity as the user logs in to a financial management platform on behalf of the entity, and a dashboard is displayed. Account data of the entity was previously evaluated, or evaluated during the log in process, to determine that the entity's widget inventory was running low.

This may be determined by comparing the inventory of the entity to other entities that operate in the same zip code, county, or state as the entity, and are in a similar industry, herein referred to as peer entities. Using account data of the peer entities, a comparison group is created, and based on a comparison of the inventory of the entity with inventory levels of the comparison group it is determined that the entity will not be able to obtain the widgets it needs in the next week or month. Accordingly, an action has been initiated in response to identifying an anomalously low inventory value. In particular, 1,000 widgets have been re-ordered from the entity's primary widget supplier.

Further still, the initiated action includes the transmission of a message (470) to the user of the entity. The message (470) informs the user what action has occurred (i.e., re-ordering of an inventory item) and why (i.e., state-wide shortage). The message (470) provides the user with the option to continue on to the dashboard, leaving the order to proceed (i.e., "Thank you" button), and an option to quickly and immediately cancel the order (i.e., "Cancel order" button).

Figure 5A:
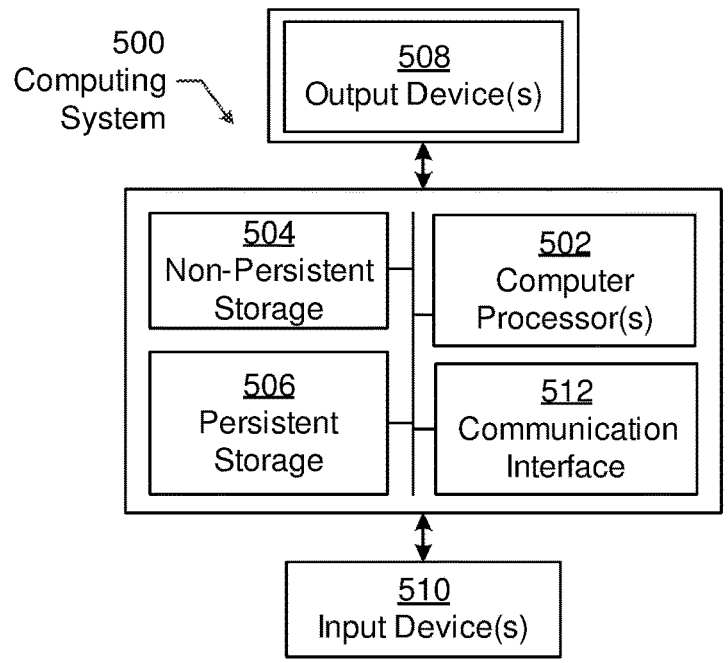
FIG. 5A shows a computing system, in accordance with one or more embodiments of the invention.

Embodiments of the invention may be implemented on a computing system. Any combination of mobile, desktop, server, router, switch, embedded device, or other types of hardware may be used. For example, as shown in FIG. 5A, the computing system (500) may include one or more computer processors (502), non-persistent storage (504) (e.g., volatile memory, such as random access memory (RAM), cache memory), persistent storage (506) (e.g., a hard disk, an optical drive such as a compact disk (CD) drive or digital versatile disk (DVD) drive, a flash memory, etc.), a communication interface (512) (e.g., Bluetooth interface, infrared interface, network interface, optical interface, etc.), and numerous other elements and functionalities.

The computer processor(s) (502) may be an integrated circuit for processing instructions. For example, the computer processor(s) may be one or more cores or micro-cores of a processor. The computing system (500) may also include one or more input devices (510), such as a touchscreen, keyboard, mouse, microphone, touchpad, electronic pen, or any other type of input device.

The communication interface (512) may include an integrated circuit for connecting the computing system (500) to a network (not shown) (e.g., a local area network (LAN), a wide area network (WAN) such as the Internet, mobile network, or any other type of network) and/or to another device, such as another computing device.

Further, the computing system (500) may include one or more output devices (508), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (502), non-persistent storage (504), and persistent storage (506). Many different types of computing systems exist, and the aforementioned input and output device(s) may take other forms.

Software instructions in the form of computer readable program code to perform embodiments of the invention may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments of the invention.

Figure 5B:
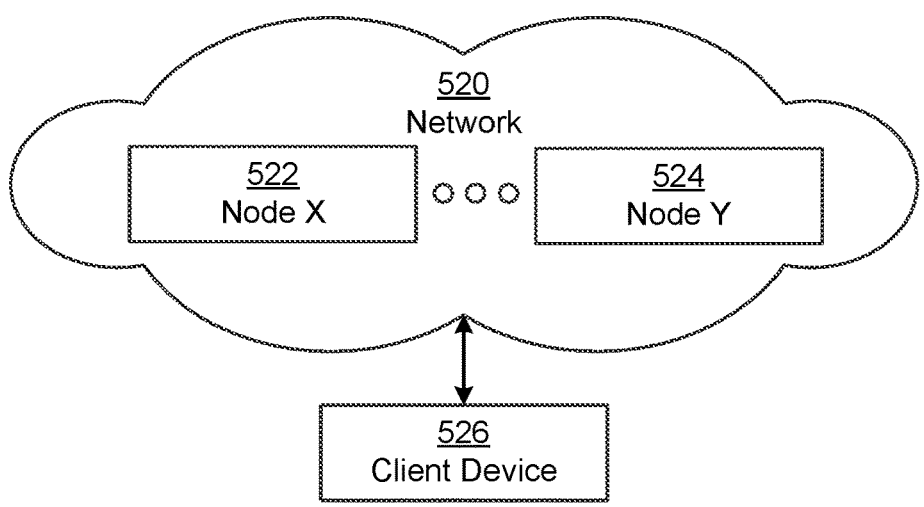
FIG. 5B shows a group of computing systems, in accordance with one or more embodiments of the invention.

The computing system (500) in FIG. 5A may be connected to or be a part of a network. For example, as shown in FIG. 5B, the network (520) may include multiple nodes (e.g., node X (522), node Y (524)). Each node may correspond to a computing system, such as the computing system shown in FIG. 5A, or a group of nodes combined may correspond to the computing system shown in FIG. 5A. By way of an example, embodiments of the invention may be implemented on a node of a distributed system that is connected to other nodes. By way of another example, embodiments of the invention may be implemented on a distributed computing system having multiple nodes, where each portion of the invention may be located on a different node within the distributed computing system. Further, one or more elements of the aforementioned computing system (500) may be located at a remote location and connected to the other elements over a network.

Although not shown in FIG. 5B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (522), node Y (524)) in the network (520) may be configured to provide services for a client device (526). For example, the nodes may be part of a cloud computing system. The nodes may include functionality to receive requests from the client device (526) and transmit responses to the client device (526). The client device (526) may be a computing system, such as the computing system shown in FIG. 5A. Further, the client device (526) may include and/or perform all or a portion of one or more embodiments of the invention.

The computing system or group of computing systems described in FIGS. 5A and 5B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file.

The computing system in FIG. 5A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g., ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions present only a few examples of functions performed by the computing system of FIG. 5A and the nodes and/or client device in FIG. 5B. Other functions may be performed using one or more embodiments of the invention.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for identifying an anomalous value in electronic account data of a business entity, comprising:
   identifying the electronic account data of the business entity for a present time period, wherein the electronic account data includes a plurality of first data values in an electronic account of the business entity;
   creating a comparison group for the business entity, wherein the comparison group includes a plurality of second data values in the electronic account of the business entity, wherein creating the comparison group further comprises:
      identifying a plurality of parameters associated with the business entity,
      selecting a subset of the parameters,
      identifying one or more peer entities, wherein each peer business entity of the one or more peer entities is associated with a set of parameters that match the subset of the parameters, and
      configuring the one or more peer entities as the comparison group, such that the plurality of second data values include electronic account data of the one or more peer entities;
   selecting, from the plurality of first data values, a subset of the first data values in the electronic account of the business entity;
   selecting, from the plurality of second data values, a subset of the second data values in the electronic account of the business entity;
   identifying the anomalous value within the subset of the first data values by comparing the subset of the first data values with the subset of the second data values;
   in response to identifying the anomalous value within the subset of first data values, selecting an action, wherein the action comprises transmitting an electronic alert to the business entity for correction of the electronic account or performing a business management activity with respect to the electronic account on behalf of the business entity; and
   initiating, by a computer and after selecting, the action.

2. The method of claim 1, wherein creating the comparison group comprises:
   determining that the electronic account data of the business entity is of a minimum age threshold;
   identifying a portion of the electronic account data that was recorded between a start date and an end date, wherein the prior time period is defined by the start date and the end date, and
   configuring the portion of the electronic account data as the plurality of second data values.

3. The method of claim 1, wherein the electronic account data of the one or more peer entities is regularized based on a clustering algorithm prior to configuring the one or more peer entities as the comparison group.

4. The method of claim 3, wherein the electronic account data of the one or more peer entities includes a chart of electronic accounts for each of the one or more peer entities, and the electronic account data of the one or more peer entities is regularized in response to a determination that at least one of the charts of electronic accounts has been modified.

5. The method of claim 1, wherein the comparison of the subset of the first data values with the subset of the second data values includes at least one of: a percentile based comparison, a density based comparison, and performing a cluster analysis.

6. The method of claim 1, wherein the business management activity is selected from the group consisting of: placing an order for a product;
   cancelling an order for a product, sending a payment, sending a request for payment.

7. The method of claim 1, further comprising:
   determining a type of the anomalous value;
   mapping the type of the anomalous value to an additional action selected from the group consisting of: placing an order for a product; cancelling an order for a product, sending a payment, sending a request for payment, initiating a communication with a third party computing system, and requesting manual review and approval of the anomalous value; and
   initiating the additional action.

8. A system for identifying an anomalous value in electronic account data of a business entity, comprising:
   a data repository storing an instance of the electronic account data in an electronic account for each of a plurality of entities;
   a library of anomaly detection methods;
   a hardware processor and memory; and
   software instructions stored in the memory and configured to execute on the hardware processor, which, when executed by the hardware processor, cause the hardware processor to:
   identify, from the instance of the electronic account data for the business entity, electronic account data of the business entity for a present time period, wherein the identified electronic account data includes a plurality of first data values for a plurality of electronic accounts for the plurality of entities;
   create a comparison group for the business entity, wherein the comparison group includes a plurality of second data values in the plurality of electronic accounts, and wherein the instance of electronic account data for the business entity includes the plurality of second data values, and the plurality of second data values originate from a prior time period, wherein the software instructions are further configured, when executed by the hardware processor, to cause the hardware processor to:
      identifying a plurality of parameters associated with the business entity,
      selecting a subset of the parameters, identifying one or more peer entities, wherein each peer business entity of the one or more peer entities is associated with a set of parameters that match the subset of the parameters, and configuring the one or more peer entities as the comparison group, such that the plurality of second data values include electronic account data of the one or more peer entities;

select, from the plurality of first data values in the plurality of electronic accounts, a subset of the first data values;

select, from the plurality of second data values in the plurality of electronic accounts, a subset of the second data values;

identify an anomalous value within the subset of the first data values by comparing the subset of the first data values with the subset of the second data values using one of the anomaly detection methods in the library;

in response to identifying the anomalous value within the subset of first data values, select an action, wherein the action comprises transmitting an electronic alert to the business entity for correction of the electronic account or performing a business management activity with respect to the electronic account on behalf of the business entity; and initiate, by hardware processor and after selecting, the action.

9. The system of claim 8, wherein creating the comparison group comprises:

determining that the instance of electronic account data for the business entity is of a minimum age threshold, identifying a portion of the instance of electronic account data that was recorded between a start date and an end date, wherein the prior time period is defined by the start date and the end date, and configuring the portion of the instance of electronic account data as the plurality of second data values.

10. The system of claim 8, wherein the electronic account data of the one or more peer entities is regularized based on a clustering algorithm prior to configuring the one or more peer entities as the comparison group.

11. The system of claim 10, wherein the electronic account data of the one or more peer entities includes a chart of electronic accounts for each of the one or more peer entities, and the electronic account data of the one or more peer entities is regularized in response to a determination that at least one of the charts of electronic accounts has been modified.

12. The system of claim 8, wherein the comparison of the subset of the first data values with the subset of the second data values includes at least one of: a percentile based comparison, a density based comparison, and performing a cluster analysis.

13. A non-transitory computer readable medium storing instructions, the instructions, when executed by a hardware processor, comprising functionality for identifying an anomalous value in electronic account data of a business entity, by:

identifying the electronic account data of the business entity for a present time period, wherein the electronic account data includes a plurality of first data values in an electronic account of the business entity;

creating a comparison group for the business entity, wherein the comparison group includes a plurality of second data values in the electronic account of the business entity, and wherein the electronic account data of the business entity includes the plurality of second data values, and the plurality of second data values originate from a prior time period, wherein creating the comparison group further comprises:

identifying a plurality of parameters associated with the business entity, selecting a subset of the parameters, identifying one or more peer entities, wherein each peer business entity of the one or more peer entities is associated with a set of parameters that match the subset of the parameters, and configuring the one or more peer entities as the comparison group, such that the plurality of second data values include electronic account data of the one or more peer entities;

selecting, from the plurality of first data values, a subset of the first data values in the electronic account of the business entity;

selecting, from the plurality of second data values, a subset of the second data values in the electronic account of the business entity;

identifying, by accessing a library comprising anomaly detection methods, the anomalous value within the subset of the first data values by comparing the subset of the first data values with the subset of the second data values;

in response to identifying the anomalous value within the subset of first data values, selecting an action, wherein the action comprises transmitting an electronic alert to the business entity for correction of the electronic account or performing a business management activity with respect to the electronic account on behalf of the business entity; and initiating, by a computer and after selecting, the action.

14. The non-transitory computer readable medium of claim 13, wherein creating the comparison group comprises:

determining that the electronic account data of the business entity is of a minimum age threshold, identifying a portion of the electronic account data that was recorded between a start date and an end date, wherein the prior time period is defined by the start date and the end date, and configuring the portion of the electronic account data as the plurality of second data values.

15. The non-transitory computer readable medium of claim 13, wherein the electronic account data of the one or more peer entities is regularized based on a clustering algorithm prior to configuring the one or more peer entities as the comparison group.

16. The non-transitory computer readable medium of claim 13, wherein the electronic account data of the one or more peer entities includes a chart of electronic accounts for each of the one or more peer entities, and the electronic account data of the one or more peer entities is regularized in response to a determination that at least one of the charts of electronic accounts has been modified.

* * * * *